Figures 1, 2:
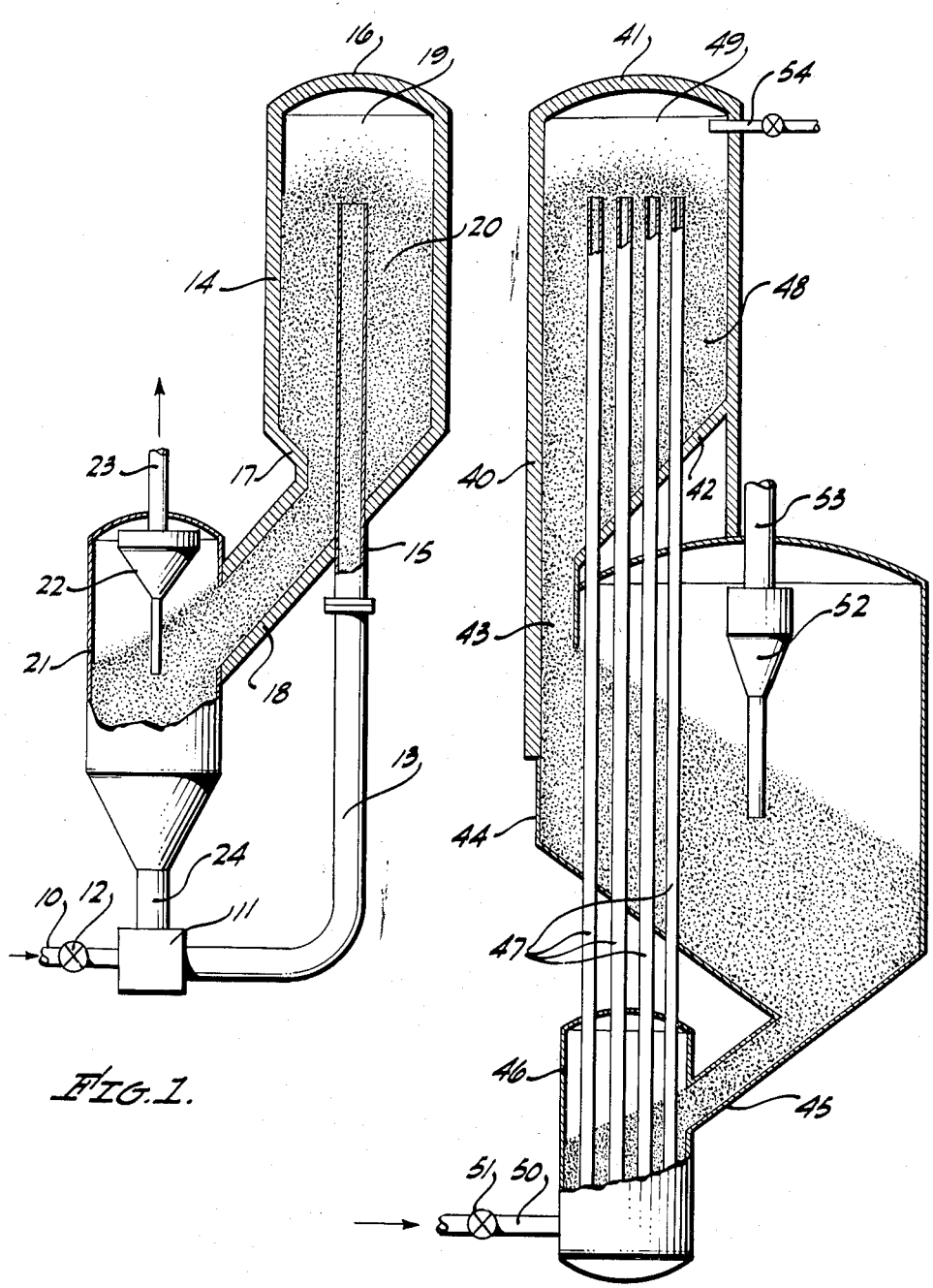

April 24, 1956

W. S. DORSEY 2,743,164

PRODUCTION OF HYDROGEN CYANIDE

Filed July 9, 1951

INVENTOR.
WILLIAM SMITH DORSEY,
BY Richard C. Horton
ATTORNEY.

United States Patent Office 2,743,164
Patented Apr. 24, 1956

2,743,164

PRODUCTION OF HYDROGEN CYANIDE

William Smith Dorsey, Fullerton, Calif., assignor to Union Oil Company of California, Los Angeles, Calif., a corporation of California Application July 9, 1951, Serial No. 235,813

13 Claims. (Cl. 23—151)

This invention relates to the production of hydrogen cyanide, and in particular concerns an improved method for preparing hydrogen cyanide by reaction between a hydrocarbon, oxygen and ammonia at elevated temperatures.

The commercial production of hydrogen cyanide is for the most part carried out by effecting reaction between methane, oxygen and ammonia at moderately elevated temperatures in the presence of a platinum catalyst. Such process secures relatively high conversions of ammonia to hydrogen cyanide, but is otherwise unsatisfactory since it requires the use of expensive catalysts which are subject to a certain amount of loss and degeneration over a period of time. Also, the effective catalysts are very sensitive to poisoning, thereby requiring that the reactants be employed in a highly purified form.

It has also been proposed to carry out the reaction non-catalytically at relatively high temperatures. As heretofore practiced, however, the non-catalytic process is thermally inefficient and requires the use of relatively large reactors of complicated design. Also, the amount of ammonia converted to hydrogen cyanide is at best only about 55 per cent of theoretical.

It is accordingly an object of the present invention to provide an improved process for the production of hydrogen cyanide from hydrocarbons, oxygen and ammonia.

Another object is to provide a non-catalytic hydrogen cyanide process which secures conversions of ammonia to hydrogen cyanide as high or higher than those attained in catalytic processes.

A further object is to provide a hydrogen cyanide process which operates without the consumption of heat indirectly supplied from exterior sources.

Other objects will be apparent from the following detailed description of the invention, and various advantages not specifically referred to herein will be apparent to those skilled in the art upon employment of the invention in practice.

I have now found that the above and related objects may be realized in a process wherein a suitably proportioned reactant gas comprising a hydrocarbon, oxygen and ammonia is passed through a preheating zone in contact with a suspended inert solid material into a substantially free-space reaction zone wherein reaction takes place with the formation of a hot product gas. The latter is then passed in contact with said solid material through a cooling zone which is so positioned with respect to the preheating zone that the hot product gas is cooled and the reactant gas is preheated by transfer of heat from the cooling zone to the preheating zone. More particularly, I have found that in the non-catalytic production of hydrogen cyanide from a reactant gas mixture comprising a hydrocarbon, oxygen and ammonia important operating advantages and good conversions of ammonia to hydrogen cyanide may be realized in a process wherein the reactant gas is preheated and the hot product gas is simultaneously cooled by indirect heat exchange between the two gases in the presence of a suspended solid material. Such mode of operation is effected according to the invention by suspending a finely-divided inert solid in the reactant gas, and passing the suspension upwardly through an elongated preheating zone of relatively small cross-sectional area which communicates with a confined reaction zone of relatively large cross-sectional area. As the gas passes from the preheating zone into the reaction zone its linear velocity suddenly decreases to a value below that required to maintain the solid material suspended in the gas stream. A substantial separation of solids from gas is thus effected immediately adjacent to the exit of the preheating zone, and the reaction which occurs in the reaction zone takes place in confined free space in the substantial absence of solid particles. The direction of flow of the gas is then reversed, and the hot product gas is passed through the space surrounding the preheating zone carrying with it the separated solids. Such space comprises a cooling zone within which the hot product gas loses its sensible heat through the walls of the preheating zone to the reactant gas passing in the opposite direction therethrough. The cooled product gas and solids are withdrawn from the bottom of the cooling zone and passed to a separating zone wherein the solids are separated and returned for re-suspension in the reactant gas stream, and the solids-free product gas is passed to a suitable system for recovering the hydrogen cyanide product in pure form. Such mode of operation permits a maximum conservation of heat and secures conversions of ammonia to hydrogen cyanide of as high as 75 per cent of theoretical. By reason of its high thermal efficiency, the present process permits relatively high gas velocities and short residence times within the reactor so that high production capacity can be attained in relatively small-size reactors. The presence of the more or less finely-divided solids promotes highly efficient transfer of heat from the hot product gas to the reactant gas, thus permitting the use of relatively large diameter short-length preheating conduits and thereby further decreasing the size and simplifying construction of the reactor.

The nature and advantages of the invention will be more clearly understood by reference to the accompanying drawing which forms a part of this specification. In said drawing, Figure 1 is a cross-sectional view of a simple apparatus illustrating the principle of the invention. Figure 2 is a cross-sectional view of an alternative form of apparatus adapted for commercial use.

Referring now to Figure 1, the reactant gas mixture is introduced into inlet 10 and passes into eductor 11 at a rate controlled by valve 12. Eductor 11 is of the type employed in fluidized catalytic cracking processes, and serves to suspend a finely-divided solid material in the reactant gas stream. The reactant gas containing suspended solids passes through duct 13 and into reactor 14 via preheating conduit 15. Reactor 14 comprises a cylindical vessel having an upper end closure 16 and a conical bottom 17 which leads directly to a duct 18. Preheating conduit 15 is coaxially positioned within reactor 14 and extends to a point relatively adjacent to upper end closure 16 of the reactor. The free space between the termination of preheating conduit 15 and end closure 16 constitutes a confined reaction zone 19, and the annular space between preheating conduit 15 and the walls of reactor 14 constitutes a cooling zone 20. Reactor 14 is suitably lined with refractory brick or other material capable of withstanding temperatures of the order of 1800° C. Preheating conduit 15 is likewise constructed of a refractory material. As the reactant gas and suspended solids pass upwardly through preheating conduit 15 they are preheated by transfer of heat through the walls of conduit 15 from the hot product gas and solids passing downwardly through cooling zone 20. When the preheated reactant gas issues from the open end of conduit 15 into reaction zone 19 its linear velocity suddenly decreases, allowing the solids to drop out of suspension and fill the cooling zone 20. The reaction thus takes place in the substantial absence of suspended solids. The hot product gas which is formed within reaction zone 19 strikes end closure 16, reverses its direction of flow, and passes down through cooling zone 20 transferring its sensible heat through the walls of preheating conduit 15 to the reactant gas passing in the opposite direction therethrough. By reason of the countercurrent flow of gases in the preheating and cooling zones and the presence of the solid material, the exchange of heat between the hot product gas and the reactant gas is extremely efficient. The product gas and solids pass from reactor 14 through duct 18 into vessel 21 wherein the product gas is separated from the solids. Such separation is effected by a conventional cyclone separator 22 positioned within vessel 21, and the product gas is withdrawn through conduit 23 and passed to a product recovery and storage system not shown. Vessel 21 is provided with a conical bottom which communicates with a duct 24 leading to eductor 11. The solids thus flow by gravity out of vessel 21 and into eductor 11 where they are re-suspended in the reactant gas. In order to conserve heat, the entire system is preferably provided with thermal insulation, not shown.

While the apparatus just described in connection with Figure 1 illustrates the principle upon which the invention is based, and may satisfactorily be employed for the manufacture of hydrogen cyanide on a small scale, it will be apparent to those skilled in the art that the reactor may take a variety of different forms adapted for larger scale operation. Figure 2 illustrates one such form of large-scale reactor.

Referring now to Figure 2, the reactor therein shown comprises a refractory-lined reaction chamber 40 having an upper end closure 41 and a sloping bottom closure 42 which communicates directly with a duct 43 leading to separation chamber 44 positioned below reaction chamber 40. Separation chamber 44 is provided with a sloping bottom which communicates directly with a duct 45 leading to a solids eductor 46. A plurality of conduits 47 arranged in a square or circular pattern extend upwardly from eductor 46, through separation chamber 44 and the sloping bottom 42 of reaction chamber 40, and terminate within reaction chamber 40 in a plane somewhat below upper end closure 41. That portion of each of conduits 47 which extends within reaction chamber 40 constitutes a preheating zone, and the space surrounding conduits 47 within chamber 40 constitutes a cooling zone 48. Reaction takes place in reaction zone 49 between the termination of preheating conduits 47 and end closure 41. The reactant gas is introduced into inlet conduit 50 at a rate controlled by valve 51, and passes into eductor 46 which serves to suspend a finely-divided solid material in the reactant gas and to distribute the suspension equally among conduits 47. The internal construction of eductor 46 is suitably the same as is employed in conventional multi-tubular gas-lift systems for transporting granular solids. As the reactant gas containing suspended solids passes upwardly through conduits 47 within reaction chamber 40 they are preheated by indirect heat exchange against the hot product gas and solids moving downwardly through cooling zone 48. The solids drop out of suspension immediately adjacent the termini of conduits 47, as previously explained, and move downwardly through the cooling zone primarily by gravity flow. The hydrogen cyanide-producing reaction takes place in reaction zone 49, and the hot product gas reverses its direction of flow and passes downwardly through cooling zone 48 along with the particulate solid material. Heat is transferred from the hot product gas and the solids through the walls of conduits 47 to the reactant gas passing upwardly therethrough, thereby effecting simultaneous cooling of the product gas and preheating of the reactant gas. The product gas and solids pass through duct 43 and into separation chamber 44 wherein the gas is separated by means of a cyclone separator 52 and is withdrawn and passed to storage via conduit 53. The solids flow by gravity through duct 45 to eductor 46 wherein they are re-suspended in the reactant gas. By suitably controlling the operating variables as hereinafter more fully explained, the reaction can be made self-sustaining once steady-state conditions have been attained, and no heat need be supplied to the reactor from exterior sources. During start-up, however, the reaction may be initiated and maintained by an auxiliary flame fed by a combustible fuel mixture supplied to the reaction zone by conduit 54.

Considering now the operating variables of the process in detail, the reactant gas consists essentially of a proportioned mixture of a hydrocarbon, oxygen and ammonia. A wide variety of hydrocarbons is suitable but best results are obtained with non-aromatic hydrocarbons, particularly those which are normally gaseous or liquid and boil below about 600° F. at atmospheric pressure. The term "non-aromatic hydrocarbon" is herein employed as a generic term including saturated and unsaturated aliphatic and cyclo-aliphatic hydrocarbons but excluding aromatic or benzenoid hydrocarbons. The normally gaseous saturated aliphatic hydrocarbons, particularly methane and natural gas, are especially preferred by reason of their low cost and ease of handling. Hydrocarbon mixtures, e. g., mixed refinery gases and various petroleum distillates are also suitable. When employing a liquid hydrocarbon reactant it is preferably vaporized prior to its admixture with the oxygen and ammonia reactants.

The oxygen reactant is usually provided in the form of air, but if desired oxygen-enriched air or even substantially pure oxygen may be employed. Air is of course preferred by reason of its lack of cost. The ammonia is usually provided in substantially pure form, but it may be employed in admixture with nitrogen, hydrogen, or other normally incident impurities. One of the desirable features of the present process resides in its operability with relatively impure reactants.

The composition of the reactant gas may be varied considerably depending upon the identity of the hydrocarbon reactant. In general, between about 0.3 and about 1.2, preferably between about 0.5 and about 1.0, mole of oxygen and between about 0.1 and about 1.0, preferably between about 0.2 and about 0.5, mole of ammonia are provided per mole of carbon in the hydrocarbon reactant. When the reactant gas comprises a mixture of methane or natural gas, air, and ammonia, it preferably comprises between about 15 and about 25 per cent by volume of the methane or natural gas, between about 65 and about 80 per cent by volume of air, and between about 3 and about 10 per cent by volume of ammonia.

The reaction temperature is in general between about 1000° C. and about 1700° C., with the optimum temperature within this range depending upon other operating variables, e. g., reactant gas composition, rate of flow through the reactor, pressure, etc. In order that the reaction may be self-sustaining, i. e., carried out without the addition of heat from exterior sources, the reactant gas should have a preheat temperature between about 600° C. and about 1500° C., preferably between about 900° C. and about 1300° C. As herein employed, the term "preheat temperature" refers to the temperature of the reactant gas at the point within the reactor where it passes from the preheating zone into the reaction zone. Such temperature provides a somewhat more convenient source of control than the higher reaction temperature, and accordingly the process is usually controlled by adjusting the reactant gas composition and velocity so as to secure the desired preheat temperature.

The process is most conveniently carried out at a pressure which is above atmospheric pressure only by the amount required to circulate the gas and solids through the reactor. If desired, however, it may be effected at pressures considerably above or below atmospheric.

The reaction time, i. e., the residence time of the gas within the reaction zone, is usually between about 0.01 and about 0.2, preferably between about 0.02 and about 0.1, second. Within this range the optimum value varies inversely with the reaction temperature, i. e., shorter reaction times are employed at the higher reaction temperatures and vice versa. Such time may be controlled by varying the rate of gas flow through the reactor, but since the preheat temperature likewise varies with such rate of flow and since the rate of gas flow must be sufficient to maintain the particulate solid material suspended in the gas stream during passage through the preheating zone, it is preferable that the reaction time should be determined for the most part by the volume of the reaction zone. Accordingly, the reactor is preferably constructed to have a reaction zone of such capacity that the desired reaction time is attained at approximately the same rate of gas flow that permits achieving the desired preheat temperature and suspension of the heat-conducting solids.

The velocity at which the reactant gas is passed through the preheating zone and into the reaction zone depends upon the composition of the reactant gas, the desired preheat temperature, the length of the preheating zone, the particle size of the heat-conducting solids, and the desired type of solids suspension. Ordinarily, however, such velocity is between about 1 and about 25 linear feet per second calculated at standard conditions of temperature and pressure. The solid material usually takes the form of a powder of about 20 to 100 mesh, and must be sufficiently refractory to withstand temperatures of the order of 1800° C. without fusing. Such materials as corundum, sillimanite, alundum, carborundum, tungsten metal, etc., are highly satisfactory. As previously stated, the solid material serves to promote highly efficient transfer of heat from the hot product gas to the reactant gas, and does not operate as a catalyst. Such function is best attained when the suspension of solids in the reactant gas is of the so-called "densephase" or "fluidized bed" type widely employed in catalytic hydrocarbon conversion processes. In such type of suspension the settling tendency of the solid particles is opposed by the lifting action of the upflowing gas stream, and the solids are maintained in a state of hindered settling. The suspended solid particles move rapidly in all directions and exert an influence on one another so as to maintain a relatively constant density throughout the suspension. Such density depends upon a number of factors, including the size and density of the solid particles and the velocity of the gas stream in which they are suspended, but ordinarily it is between about 10 and about 50 pounds per cubic foot. Higher densities of the order of 50 to 100 pounds per cubic foot may be attained through the use of a high specific gravity solid material. While it is preferred that the suspension of solids in reactant gas which is passed through the preheating zone be of the "dense phase" type, the solids may also be in compacted form and the gas velocity so adjusted that the upward flow of the solids through the preheating zone is effected in accordance with mass flow principles. Also, but less desirably, the suspension may be of low concentration so that the flow of solids is effected by ordinary gas lift operation.

As previously stated, a separation of solids from the preheated reactant gas takes place at the terminus of the preheating zone within the reactor by reason of the sudden decrease in gas velocity which occurs when the gas issues from the relatively narrow preheating zone into the wider reaction zone. Uusually it is desirable that the reaction zone have a cross-sectional area at least six times the cross-sectional area of the preheating zone. The solids which drop out of suspension as the gas enters the reaction zone occupy substantially the entire volume of the cooling zone which likewise desirably has a free cross-sectional area at least six times that of the preheating zones. The downward flow of the solids through the cooling zone is of the moving bed type and is to a considerable extent motivated by gravity, although such flow is materially assisted by the product gas which likewise passes downwardly through the cooling zone.

As a direct consequence of carrying out the preheating and cooling operations in the presence of an inert finely divided solid, there is permitted the use of relatively large diameter and short length preheating conduits. When the process is carried out in the absence of such solid it has been found that the length of the preheating zone should be from about 25 to about 35 times its diameter. However, it is desirable that the product gas be cooled as quickly as is consistent with efficient transfer of heat to the reactant gas, i. e. the residence time of the product gas within the cooling zone should be relatively short. At gas velocities which permit attainment of the requisite preheat temperature, the cooling zone is most suitably from about 2 to about 20 inches long. By so limiting the length of the cooling zone (and consequently the length of the preheating zone) the diameter which the preheating conduits may take is limited to about 0.06 to 0.5 inch and is preferably about 0.125 inch. I have found, however, that by effecting the preheating operation in the presence of suspended heat-conducting solids the ratio between the length of the preheating zone and its cross-sectional area may be reduced to between about 3/1 and about 8/1. Thus, a preheating conduit 2 inches in diameter need be only 10 to 16 inches long, and satisfactory conversion of ammonia to hydrogen cyanide can be attained with preheating conduits of this diameter or larger.

As will be apparent to those skilled in the art, many variations in the design and construction of the apparatus are permitted within the scope of the invention. Usually, the reactor will comprise a plurality of preheating conduits positioned within a common cooling chamber and communicating with a common reaction zone. Regular geometric spacing of the conduits within the cooling zone is preferred. Any of the conventional means for forming and handling gaseous suspensions of solids may be applied to practice of the invention, and the techniques which are employed for such purposes in fluidized bed catalytic processes are particularly adaptable to the present process. Similarly, a number of means are available for recovering the hydrogen cyanide from the product gas, e. g., selective solvent extraction as with water or an organic solvent, selective adsorption, etc., and any of such known means may be employed in treating the hydrogen cyanide-containing product gas produced by the present process. The essence of the invention lies in the steps of preheating the reactant gas while in contact with suspended finely divided inert solids, causing a separation of said solids from the preheated reactant gas, allowing the preheated reactant gas to undergo reaction in a confined substantially free space reaction zone, passing the product gas and separated solids in indirect heat exchange relationship with the reactant gas in contact with the suspended solids whereby the product gas and reactant gas are simultaneously cooled and heated, respectively, and thereafter separating the cooled product gas from the solids and returning the latter for resuspension in the reactant gas stream.

Other modes of applying the principle of my invention may be employed instead of those explained, change being made as regards the materials or apparatus employed, provided the step or steps stated by any of the following claims, or the equivalent of such stated step or steps be employed.

I, therefore, particularly point out and distinctly claim as my invention:

1. A process for the production of hydrogen cyanide which comprises (1) suspending finely divided inert solids in a reactant gas stream comprising a non-aromatic hydrocarbon having an atmospheric boiling point below about 600° F., oxygen and ammonia; (2) passing the reactant gas containing suspended solids through a preheating zone wherein it is heated to a temperature between about 600° C. and about 1500° C. substantially solely by indirect heat exchange with hot product gas and said solids; (3) passing the preheated reactant gas and solids into a confined free space reaction zone wherein reaction occurs with the formation of a hot hydrogen cyanide-containing product gas, said reaction zone having a cross-sectional area substantially larger than said preheating zone; (4) maintaining the residence time of the reacting gas within the reaction zone between about 0.01 and about 0.2 second; (5) passing said product gas together with the separated solids through a cooling zone in indirect heat exchange relationship with said preheating zone, whereby said product gas and solids are cooled by transfer of heat to the reactant gas containing suspended solids passing through said preheating zone; (6) separating the cooled product gas from said solids and (7) returning the separated solids without the addition of heat thereto to step (1) for re-suspension in the reactant gas stream.

2. A process for the production of hydrogen cyanide which comprises (1) suspending finely divided inert solids in a reactant gas stream comprising a non-aromatic hydrocarbon having an atmospheric boiling point below about 600° F., oxygen and ammonia; (2) passing the reactant gas containing suspended solids through a preheating zone wherein it is heated to a temperature between about 600° C. and about 1500° C. substantially solely by indirect heat exchange with hot product gas and said solids; (3) separating the suspended solids from the preheated reactant gas; (4) passing the preheated reactant gas into a confined free space reaction zone wherein reaction occurs with the formation of a hot hydrogen cyanide-containing product gas; (5) maintaining the residence time of the reacting gas within the reaction zone between about 0.01 and about 0.2 second; (6) passing said product gas together with the separated solids through a cooling zone in indirect heat exchange relationship with said preheating zone, whereby said product gas and solids are cooled by transfer of heat to the reactant gas containing suspended solids passing through said preheating zone; (7) separating the cooled product gas from said solids and (8) returning the separated solids without the addition of heat thereto to step (1) for re-suspension in the reactant gas stream.

3. The process of claim 2 wherein the reactant gas comprises a normally gaseous saturated aliphatic hydrocarbon, between about 0.3 and about 1.2 moles of oxygen per mole of carbon in said hydrocarbon, and between about 0.1 and about 1.0 mole of ammonia per mole of carbon in said hydrocarbon.

4. The process of claim 3 wherein the hydrocarbon reactant is selected from the class consisting of natural gas and methane.

5. The process of claim 3 wherein the oxygen reactant is in the form of air.

6. A process for the production of hydrogen cyanide which comprises (1) suspending finely-divided heat-conducting inert solids in a reactant gas stream comprising a non-aromatic hydrocarbon having an atmospheric boiling point below about 600° F., oxygen and ammonia; (2) passing the reactant gas stream containing suspended solids upwardly through a preheating zone wherein it is heated to a temperature between about 600° C. and about 1500° C. substantially solely by indirect heat exchange with hot product gas and solids passing downwardly through a cooling zone surrounding and in heat exchange relationship with said preheating zone; (3) passing said stream directly from said preheating zone into a confined reaction zone, the cross-sectional area of which is greater than that of said preheating zone by such an amount that as the gas enters therein its velocity decreases to a value below that required to maintain said solids suspended in the gas stream, thereby effecting a separation of said solids from the gas, whereby reaction occurs within the reaction zone with the formation of a hot hydrogen cyanide-containing product gas in the substantial absence of suspended solids; (4) reversing the direction of gas flow within said reaction zone; (5) maintaining the residence time of the reacting gases within the reaction zone between about 0.01 and about 0.2 second; (6) passing the hot product gas and the separated solids downwardly through said cooling zone whereby said product gas and solids are cooled by indirect heat exchange with the reactant gas containing suspended solids passing upwardly through said preheating zone; (7) separating the cooled product gas from said solids; and (8) returning the separated solids without the addition of heat thereto to step (1) for re-suspension in the reactant gas stream.

7. The process of claim 6 wherein the suspension of finely divided heat-conducting inert solids in the reactant gas is of the dense phase type having a density between about 10 and about 100 pounds per cubic foot.

8. The process of claim 6 wherein the reactant gas comprises a normally gaseous saturated aliphatic hydrocarbon, between about 0.3 and about 1.2 moles of oxygen per mole of carbon in said hydrocarbon, and between about 0.1 and about 1.0 mole of ammonia per mole of carbon in said hydrocarbon.

9. The process of claim 8 wherein the hydrocarbon reactant is selected from the class consisting of methane and natural gas.

10. The process of claim 8 wherein the oxygen reactant is in the form of air.

11. The process of claim 8 wherein the reactant gas comprises between about 15 and about 25 per cent by volume of a hydrocarbon selected from the class consisting of methane and natural gas, between about 65 and about 80 per cent by volume of air, and between about 3 and about 10 per cent by volume of ammonia.

12. A process for the production of hydrogen cyanide which comprises (1) suspending finely-divided heat-conducting inert solids in a reactant gas stream comprising between about 15 and about 25 per cent by volume of a hydrocarbon selected from the class consisting of methane and natural gas, between about 65 and about 80 per cent by volume of air, and between about 3 and about 10 per cent by volume of ammonia; (2) passing the reactant gas stream containing suspended solids upwardly through an elongated preheating zone wherein said gas and suspended solids are preheated to a temperature between about 900° C and about 1300° C. substantially solely by indirect heat exchange with hot product gas and solids passing downwardly through a cooling zone surrounding and in heat exchange relationship with said preheating zone; (3) passing said stream directly from said preheating zone into a confined reaction zone, the cross-sectional area of which is greater than that of said preheating zone by such an amount that as the gas enters therein its velocity decreases to a value below that required to maintain the solids suspended in the gas stream, thereby effecting a separation of said solids from the gas, whereby reaction occurs within the reaction zone at a temperature between about 1000° C. and about 1700° C. in the substantial abence of suspended solids to form a hot hydrogen cyanide-containing product gas, the volume of said reaction zone being such that the residence time of the reacting gas therein is between about 0.01 and about 0.2 second; (4) reversing the direction of gas flow within said reaction zone; (5) passing the hot product gas and separated solids downwardly through said cooling zone whereby said product gas and solids are cooled by indirect heat exchange with the reactant gas containing suspended solids passing upwardly through said preheating zone; (6) separating the cooled product gas from said solids; and (7) returning the separated solids without the addition of heat thereto to step (1) for re-suspension in the reactant gas stream.

13. The process of claim 12 wherein the suspension of finely divided heat-conducting inert solids in the reactant gas stream is of the dense phase type having a density between about 10 and about 100 pounds per cubic foot.

References Cited in the file of this patent

UNITED STATES PATENTS

| | | |
|---|---|---|
| 2,069,545 | Carlisle | Feb. 2, 1937 |
| 2,432,872 | Ferro | Dec. 16, 1947 |
| 2,487,961 | Angell | Nov. 15, 1949 |